(12) United States Patent
Bellwood et al.

(10) Patent No.: US 6,684,166 B2
(45) Date of Patent: Jan. 27, 2004

(54) PRESSURE SENSITIVE KEYBOARD

(75) Inventors: Thomas Alexander Bellwood, Austin, TX (US); Julio Eloy Ruano, Austin, TX (US); Matthew Francis Rutkowski, Pflugerville, TX (US); Merle Douglas Sterling, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/138,899

(22) Filed: May 2, 2002

(65) Prior Publication Data

US 2003/0208324 A1 Nov. 6, 2003

(51) Int. Cl.$^7$ ................................................. G01L 5/22
(52) U.S. Cl. ........................................... 702/41; 702/33
(58) Field of Search .................... 702/33, 41, 138, 702/139

(56) References Cited

U.S. PATENT DOCUMENTS

| | | | | |
|---|---|---|---|---|
| 5,510,783 A | * | 4/1996 | Findlater et al. | 341/34 |
| 5,579,238 A | * | 11/1996 | Krugman | 702/41 |
| 5,745,376 A | | 4/1998 | Barker et al. | |
| 5,982,357 A | * | 11/1999 | Burgett et al. | 345/168 |
| 6,330,514 B1 | * | 12/2001 | Kuo | 702/35 |

FOREIGN PATENT DOCUMENTS

JP            05189118       *  7/1993

OTHER PUBLICATIONS

Kano, G; Fujiwara, S; Sawaki, T;"Pressure–Sensitive Schottky Barrier Transistor and Switching Device for Keyboard Applications"; Digest Of Technical Papers 1970 IEEE Int'l Solid–State Circuits Conference;vol. XIII; Feb. 1970; pp 92–93.*

Bolduc, A; Beauregard, G; LaCourse<J;"A Method of Measuring Finger Pressure During Keyboard Data Entry";9$^{th}$ IEEE Instrumentation And Measurement Technology Conference; May 12–14, 1992; pp 57–58.*

Watanabe, K; Kosaka, H;Evaluation of Keyboard Switches Based on Kansei (Human Sensitivity) Information;Proceedings 4$^{th}$ Int'l Workshop On Robot And Human Communication; Jul. 5–7, 1995; pp 65–70.*

KBC 2001 Ergoforce Keyboard: "KBC 2001", download from http://www.keyboard.com/KBC2001.htm on Mar. 13, 2002. 1pg.

PCWorld.com: "May the ErgoForce Be With You", Jul. 1999 issue of PC World Magazine, download from http://www.pcworld.com/resource/printable/article/0,aid,11089,00.as on Mar. 13, 2002, 1pg.

Goble, Gord, ZDNet: "Saitek P8000 Command Pad", Apr. 11, 2001, download from http://www.zdnet.com/products/stories/reviews/0,416,2707,00.html on Mar. 13, 2002, 4pgs.

Essex, David, CNN: "Keyboard fights finger fatigue", Mar. 26, 1999, download from http://www.cnn.com/TECH/computing/9903/26/keyboard.idg on Mar. 13, 2002. ©2001 Cable News Network.

"Field Effect Transistor", download from http://www.st–and.ac.uk/~www_pa/Scots_Guide/first11/part7/page1.html on Mar. 28, 2002. 2pgs.

"J FET Characteristics", download from http://www.st–and.ac.uk/~www_pa/Scots_Guide/first11/part7/page2.html on Mar. 28, 2002. 3pgs.

* cited by examiner

*Primary Examiner*—Michael Nghiem
*Assistant Examiner*—Douglas N Washburn
(74) *Attorney, Agent, or Firm*—Marilyn Smith Dawkins (57) ABSTRACT

A keyboard integrated with a computer with a mechanism for determining a pressure sensitivity needed to register a desired keystroke is disclosed. A keystroke is registered for a given key if a force on the given key exceeds the determined pressure sensitivity. A user configuration profile can be utilized to specify a needed pressure sensitivity. Pressure sensitivity can also be determined dynamically. A threshold amount of pressure needed to register a keystroke can be compared to a measured amount of pressure applied during the keystroke and if the measured pressure meets the threshold pressure, the keystroke is registered. A control module, which can include an alphanumeric scale, can be utilized to set a threshold amount of pressure needed to register a keystroke. Some embodiments can also include a threshold amount of pressure set for each individual key.

17 Claims, 8 Drawing Sheets

PRESSURE SENSITIVE KEYBOARD

BACKGROUND

This invention relates generally to an apparatus and method for determining a pressure sensitivity needed to register a keystroke. In particular, the present invention relates to a keyboard apparatus and method to modify an amount of pressure needed to register a keystroke of a key.

Many people experience difficulty making efficient use of a keyboard associated with a computer or other device. Difficulty can be related to manual dexterity limitations, such as those related to a disease. For example, Parkinson's disease, severe arthritis or other disease can limit the ability to control fingers with precision and although a correct key may be primarily hit, other keys may also be activated by ancillary movement of fingers. This can cause numerous errors and result in frustration. Sometimes a user will lack coordination to hit a desired key on its own or hit multiple keys due to resting weight placed on the keyboard with a hand or fingers.

Unintended activation is furthered by the high sensitivity of most keyboards, such that a person who may have little trouble typing on a manual typewriter, which has far lower sensitivity, may have difficulty typing on a typical computer keyboard.

It has been known to create a computer keyboard with keys that vary key resistance according to a key position on the keyboard. However such keyboards are designed to address a preconceived relative strength of different fingers wherein, for example, instead of a consistent 55 grams of force to register a keystroke, a key assigned to a "weaker" finger may only require 35 grams of force, and a key assigned to a "stronger" finger may require 80 grams of weight. Force required to register a keystroke for each key is designed into the keyboard according to what a manufacturer deems is appropriate and cannot be changed programmatically, or otherwise, to suit the needs of a particular user.

Therefore, it would be advantageous to provide a method and apparatus that overcame the drawbacks of the prior art. In particular, it would be desirable to provide a method and apparatus that allows a force required for activation of a key to be changed according to the attributes of a particular operator. In addition, it would be desirable to provide a method and apparatus that allows for a force required for keystroke registration.

SUMMARY

Accordingly, the present invention includes a keyboard integrated with a computer with a means for determining a pressure sensitivity needed to register a desired keystroke and a means for registering a keystroke of a given key if a force on the given key exceeds the determined pressure sensitivity. Embodiments can include a user configuration profile specifying the needed pressure sensitivity. In addition, pressure sensitivity can be determined dynamically. A pressure sensitive electronic circuit can be utilized to ascertain if a force on a given key exceeds the determined pressure sensitivity.

In another aspect, a keyboard can include a key capable of a keystroke and a pressure transducer which can measure an amount of pressure applied during the keystroke, such that a keystroke can be registered in response to a threshold amount of pressure being exerted upon the key. A threshold amount of pressure needed to register a keystroke can be compared to a measured amount of pressure applied to the key. If the measured pressure meets the threshold pressure, a keystroke can be registered. A control module, such as, for example, with an alphanumeric scale, can be utilized to set a threshold amount of pressure needed to register a keystroke. Some embodiments can include a threshold amount of pressure set for each individual key.

In another aspect, the present invention can include a means of identifying a user, such as, for example, by user ID or other identification mechanism, such that the threshold amount of pressure needed to register a keystroke can be determined specific to the user. Embodiments can include a mechanism that can measure an amount of pressure applied to each key during a profile building period, linked to a device that can subtract a delta from the measured pressure, in order to determine a threshold amount of pressure for each individual key. For example, a pressure transducer, such as a pressure sensitive field effect transistor, can be linked to control module in order to measure an amount of pressure applied to keys during a profile building period. These pressure measurements can be utilized as a reference to calculate a threshold pressure.

Different embodiments can include the pressure transducer being mounted beneath the key or in a membrane over the keys such that the transducer is subjected to mechanical pressure as the key is depressed.

Embodiments of the present invention can include a method, executable software, or a data signal implementing the inventive concepts of the present invention. The data signal can be operative with a computing device, and executable software can be embodied on a computer readable medium.

Various features and embodiments are further described in the following figures, description and claims.

DESCRIPTION OF THE DRAWINGS

FIG. 8 a illustrates an exemplary data structure that can be utilized in a database implementing the present invention.

DETAILED DESCRIPTION

The present invention includes an apparatus and method for providing a pressure sensitive input device wherein a user can specify an amount of pressure needed to register a keystroke or other data input. Embodiments include a keyboard apparatus and a control panel which can be manifested as hardware or software or firmware. The control panel can be utilized to modify an amount of pressure needed to register a keystroke of a key, activation of a mouse click, or other input action.

Figure 1:
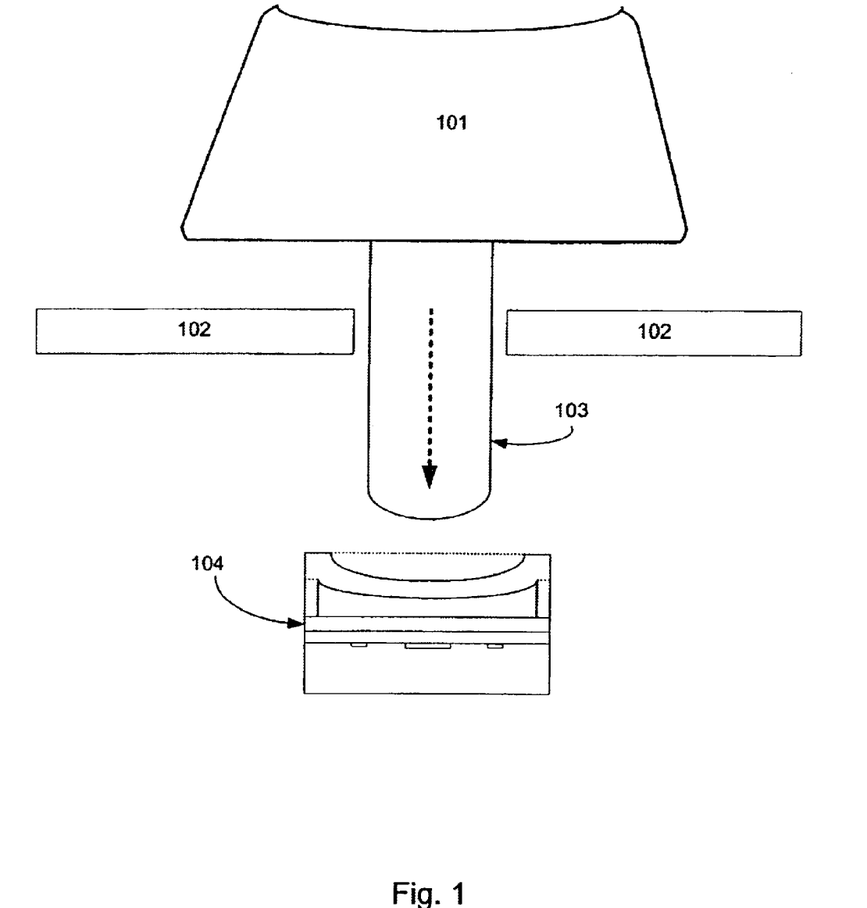
FIG. 1 illustrates a block diagram illustrating major components included in the invention.

Referring now to FIG. 1, basics components that can be included in the present invention are illustrated. The components can include a key 101 having a plunger 103, or other portion, which is supported by a support structure 102, such as a keyboard frame. The plunger can be utilized to position the key for vertical movement. As the key travels downward, the plunger 103 or other portion can come to bear upon a pressure transducer 104 which can convert a downward mechanical force into an electrical signal. The electrical signal can be indicative of the amount of force being exerted upon the transducer 104.

Each key 101 can have a threshold amount of pressure associated with it. The threshold amount of pressure can be the pressure sensitivity needed to register a desired keystroke. As the threshold amount of pressure is exerted upon the transducer 104, a keystroke can be registered and an appropriate signal generated from the keyboard or other apparatus that the key is associated with.

Figure 2:
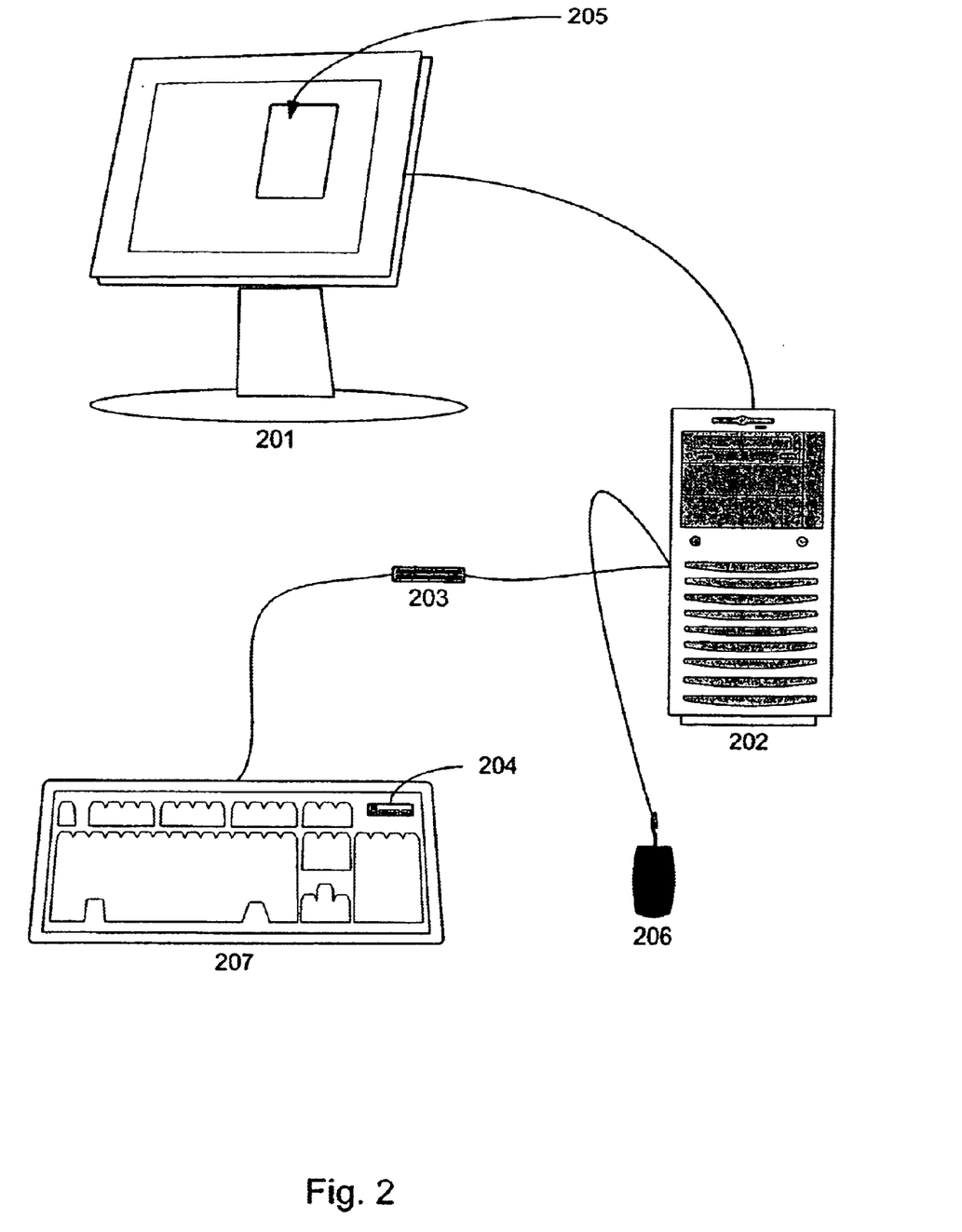
FIG. 2 illustrates components of a system that can be utilized while implementing the present invention.

Referring now to FIG. 2, an exemplary system that can utilize the present invention is illustrated. The system can include a computing unit 202 containing a processor, memory and storage device. The computing unit can be functionally connected to a display 201 and input devices, such as a keyboard 207, a mouse 206 or other input device.

Each one of the keys 210 on keyboard 207, a button on a mouse 206, or other input device, can include a pressure sensitive transducer which can measure an amount of pressure associated with an input depression such that the measured pressure can be compared to a pressure sensitivity needed to register the input. The comparison can include determining whether a predetermined threshold pressure has been met or exceeded. A control module can be utilized to store a pressure threshold for each key and register a keystroke if the measured pressure is equal to or greater tan the threshold pressure. The control module can be embodied in a hardware device 204 incorporated into a keyboard 207, a device 203 inline between the keyboard 207 and the computing unit 202, or a software control module including a software program executed by the computing device 202. A software control module can include a display device, such as a graphical user interface (GUI) 205, which can be utilized to set a threshold pressure for a key or take other actions. The GUI can include a user configuration profile. Embodiments of the user configuration profile can include identification of a user and a needed pressure sensitivity associated with the identified user.

A threshold pressure for a key can be set according to any method that allows for a threshold to be associated with a particular key. Embodiments can include a scaled setting, such as a scale of 1 through 10, wherein a user can select a number from the scale as a threshold pressure. For example, a 1 on a scale can represent a minimum pressure threshold to register a keystroke, and a 10 can represent a maximum setting. A scale can be represented on any of the control module embodiments. A scaled value can be represented by numerous mechanisms for indicating a level, such as, for example, an alphanumeric value, a position on a sliding scale, a dial setting, a color scheme, or other device for indicating a scaled value.

In another aspect, a key can be associated with a threshold setting using a device suitable to an application, such as, for example, a scaled threshold setting can be set for each individual key, a mapped area of keys can receive a shared threshold setting, an entire keyboard can receive a single threshold setting, or other arrangement. Setting a threshold for an individual key can include selecting the key, such as by depressing the key, or clicking on a representation of the key on a GUI and then selecting a scaled value.

Multiple keys can also be mapped on a keyboard and a threshold level can be set for the mapped keys. For example, a keyboard 207 may be separated into five mapped areas. A first area may include keys that are most difficult to depress for a particular user. This first area may receive a low threshold setting of, for example, 2 on a pressure scale. A second area may be easier for the user to depress and be set at 4 on the scale. In this fashion, keys associated with each mapped area can receive a pressure threshold setting.

Other embodiments can also include a set of standards that can be associated with mapped keys. In these embodiments, a user may prefer a mapped setting with an arbitrary name, such as an "alpha" setting. The user is able to sit at any accommodating keyboard and select the alpha setting and know that the threshold pressure for each key will be set at a level the user is familiar with.

Still further embodiments can include a user configuration profile. In these embodiments, as a user can log on to a computing device 202. The computing device 202 will associate a preferred pressure threshold for each key with the user logged in. The computing device will operate according to the preferred pressure. Similar to user configuration profile embodiments, additional embodiments can include a user accessing system control software, such as a control panel GUI, to adjust the pressure threshold for the keyboard keys 210 as they would adjust any number of system features.

A user configuration profile can also be generated dynamically, for example, by allowing a user to type during a profile building period. Pressure measurements from each key can be recorded during the profile building period and a customized profile can be optimized for a particular user based upon the recorded pressure measurements. For example, a user can type out a test pattern that will require the user to depress each key 210 on a keyboard 207. The pattern can be typed once, or multiple times. An algorithm can be utilized to set a threshold pressure for each key based upon the recorded measurements. The algorithm can be any variation of the recorded data, such as, for example, a delta set below an average or median pressure exerted by the user for a particular key. Any other procedure that allows for a pressure to be associated with each key can also be utilized.

A control module incorporated into a keyboard 207 or other user input device can be useful for adapting a pressure sensing capability with existing computing devices 202. For example, by incorporating the control module into the keyboard 207, the pressure of a keystroke can be measured and a decision made on whether to register the keystroke at the keyboard 207. If the keystroke is registered, an industry standard signal can be transmitted along an appropriate wire to a designated keyboard input at the computing device 202.

Other embodiments can include a pressure sensitive keyboard 207 connected to a multi-purpose type input, such as, for example, a universal serial bus (USB) port. These embodiments can include software executed on the computing device 202 which can receive and process information received from the pressure sensitive keyboard 207. A control module 205 can be displayed on a display 201 or other output device to facilitate a setup process or key pressure setting.

Still other embodiments can include a neoprene membrane or other covering that can be retrofitted over an existing keyboard 207 utilized with a computing device 202. In these embodiments, an inline control module 203 can be utilized wherein the keyboard connector can be received by the inline control module 203. A keystroke can be received by the inline control module 203 as well as a pressure measurement corresponding with the keystroke. The control module can determine if the pressure measurement meets the threshold whereby the keystroke will be registered and a signal transmitted to the computing device 202.

The computing device 202 can include one or more databases storing data relating to keyboard key activation pressure, such as a list of users, threshold pressures, predefined key pressure arrangements, recorded data, or other information. For example, if desired, some embodiments can include a process whereby in addition to registered keystrokes being processed by the computing device 202, the computing device can receive and store pressure measurements associated with all key depressions. This can include pressure measurements for registered and non-registered keystrokes. The stored data can be analyzed over time and modifications can be made to a pressure threshold if the analysis indicates it is appropriate.

Embodiments can also include analysis and customization of key pressure thresholds on an ongoing automatic basis according to any changes in recorded measurements. For example, analysis may indicate that a higher pressure threshold is appropriate in morning hours and lower in afternoon or evening hours, or that threshold pressure should change as a result of the length of a typing session, or in response to a typing rate being experienced. For example, an increased typing rate, or a typing rate that exceeds a threshold of keystrokes per minute may indicate that a decreased threshold pressure is appropriate. In another aspect, pressure measurements can be recorded in order to track the relative dexterity of a user, such as a user with a particular health condition. For example, keystroke data associated with a user undergoing physical therapy can be recorded and analyzed in order to track improvements in dexterity. Improved dexterity may be evident, for example, by pressure being accurately applied to a primary key with very little pressure measured at ancillary keys. Any other type of analysis that is related to the recorded pressure measurements is also within the scope of the present invention.

Software associated with a pressure sensitive keyboard 207 can include any executable program code. In some cases, an executable program, such as a Java™ program, may be downloaded from a website available in the Internet and installed on the computing device 202. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
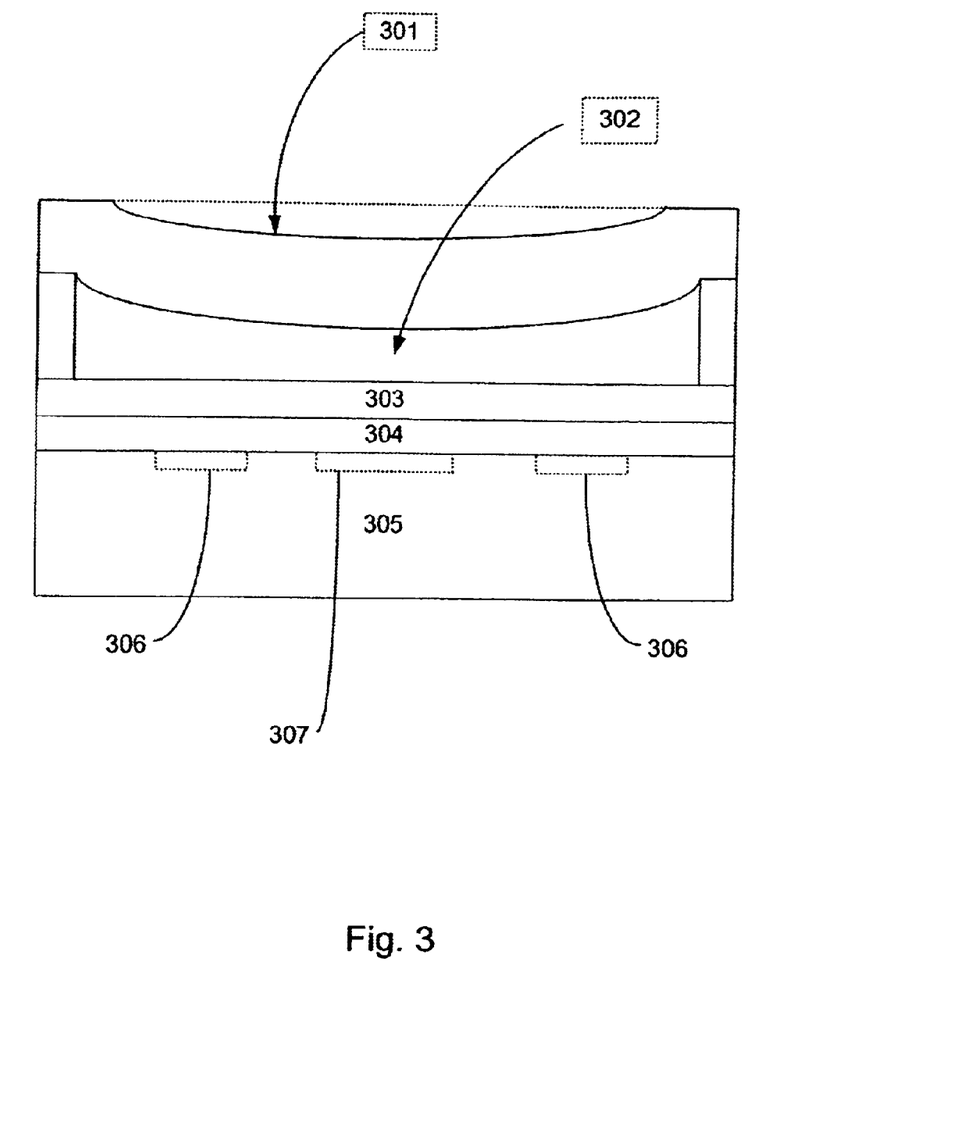
FIG. 3 illustrates a model of a pressure sensitive field effect transistor which can be useful for determining the pressure of a keystroke.

Referring now to FIG. 3, an exemplary representation of a pressure transducer is illustrated. The pressure transducer can be a pressure sensitive field effect transistor (FET) which can include a formable polysilicon surface area 301 placed over a sealed vacuum area 302 positioned on layers of a FET. The layers of the FET can include a nitride 303 on top of an oxide layered on a substrate 305 containing a source area 307 and drain areas 306. As pressure is applied to the polysilicon surface area, it can cause the polysilicon to deflect, which in turn can create a dielectric variation thereby creating a pressure to current transducer which can be used to measure the pressure of a keystroke.

Figure 4:
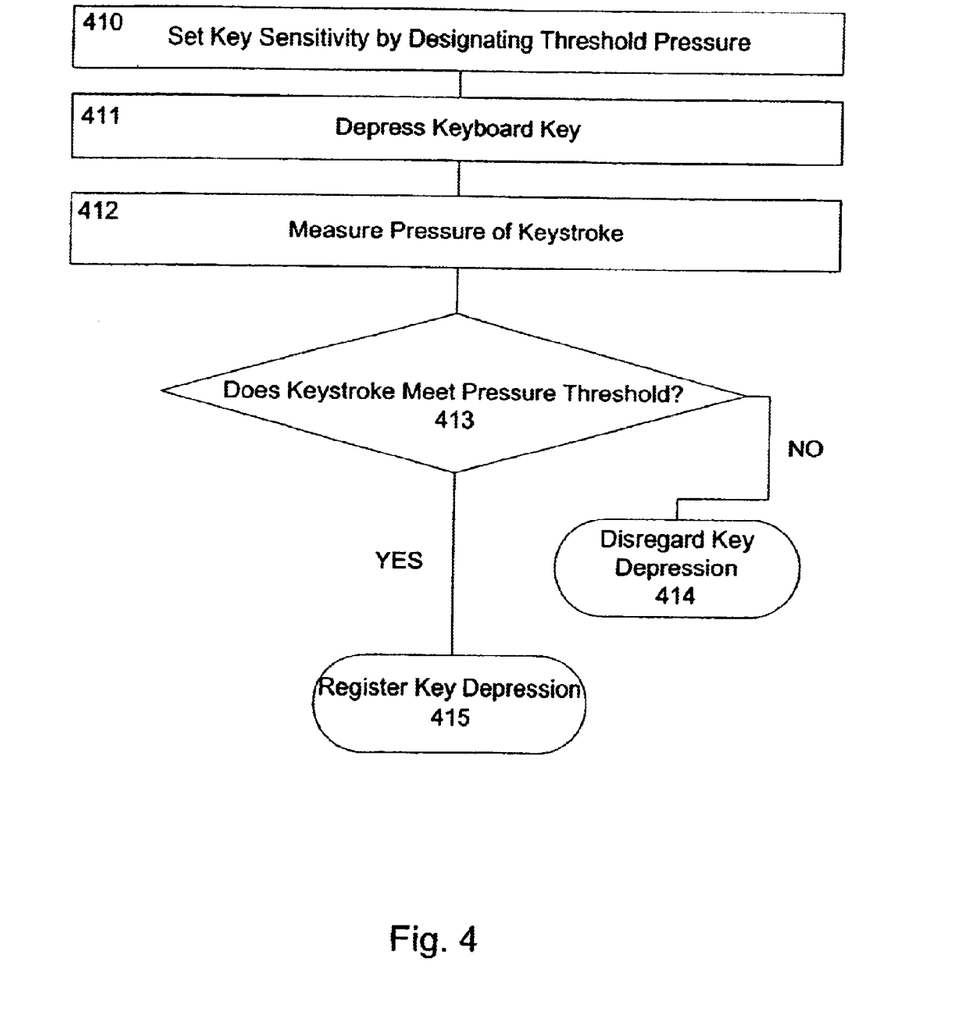
FIG. 4 illustrates a flow of exemplary steps that can be executed while implementing the present invention.

Referring now to FIG. 4, exemplary steps that can be taken to implement the present invention can include setting a key sensitivity 410 by setting a key pressure threshold, and causing a keystroke by depressing a key on a keyboard 411. The pressure of the keystroke can be measured 412. A determination can be made as to whether the measured keystroke pressure meets the pressure threshold 413. If it does meet the threshold, the key depression can be registered 415. If it does not meet the threshold, the key depression can be disregarded 414.

Figure 5:
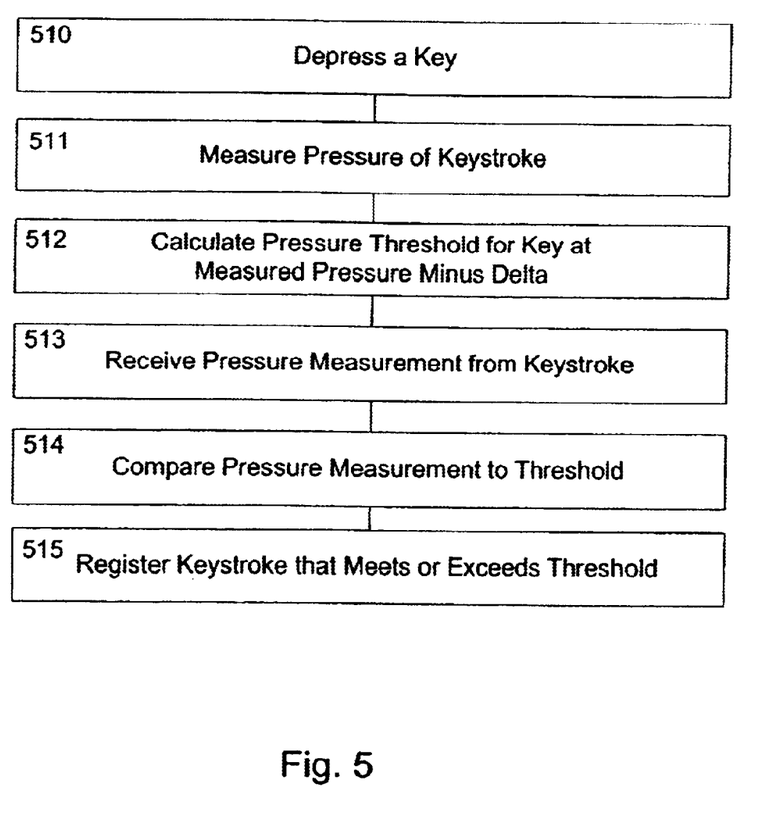
FIG. 5 illustrates a flow of exemplary steps that can be executed while implementing the present invention including measuring pressure of a typical keystroke.

FIG. 5 illustrates steps that can be included in embodiments that will utilize a measured keystroke pressure to set a pressure threshold. A key can be depressed 510 resulting in a keystroke. The pressure of the keystroke can be measured 511 and a pressure threshold can be calculated 512. The pressure threshold calculation 512 can include, for example, subtracting a predetermined delta from the measured pressure. A subsequent pressure measurement can be received from a keystroke 513 and compared to the threshold pressure 514. A keystroke can be registered if the subsequent pressure measurement meets or exceeds the threshold pressure setting 515.

Figure 6:
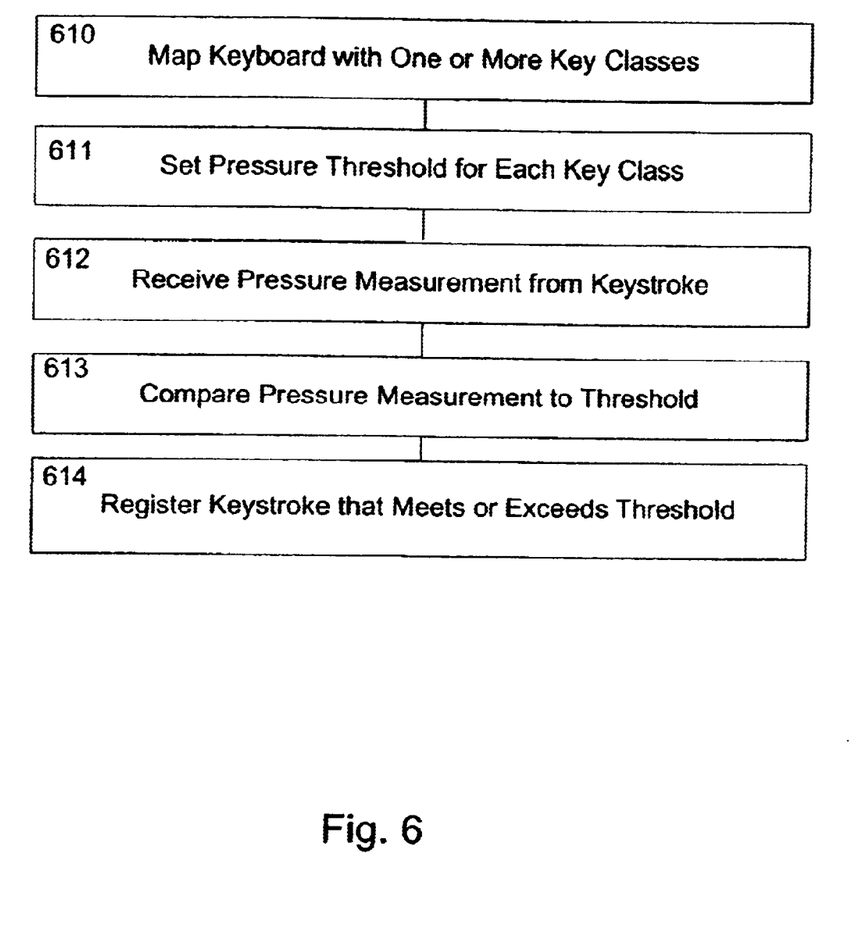
FIG. 6 illustrates a flow of exemplary steps that can be performed by while implementing the present invention including associating mapped keys with a pressure threshold.

Referring now to FIG. 6, steps included in other embodiments can include mapping a keyboard with one or more key classes 610 and setting a pressure threshold for each key class 611. A pressure measurement from a keystroke can be received 612 and compared to a pressure threshold 613. Keystrokes associated with a pressure measurement that meets or exceeds a pressure threshold can be registered 614.

Figure 7:
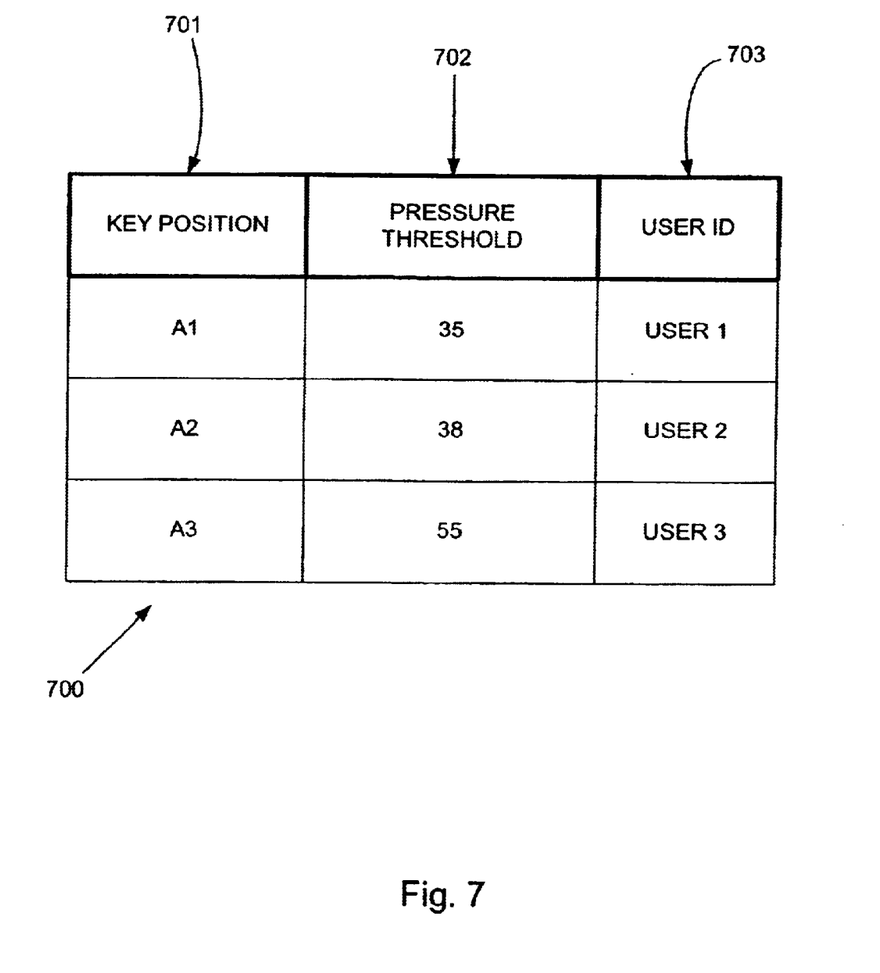
FIG. 7 illustrates components of a system that can be utilized while implementing the present invention.

Referring now to FIG. 7, an exemplary data structure that can be utilized in a database implementing the present invention is illustrated. The database structure 700 can include a key position data field 701, a pressure threshold data field 702, a user ID data field 703 and any other data field that may be useful to implementing or analyzing pressure sensitive keystrokes.

Figure 8:
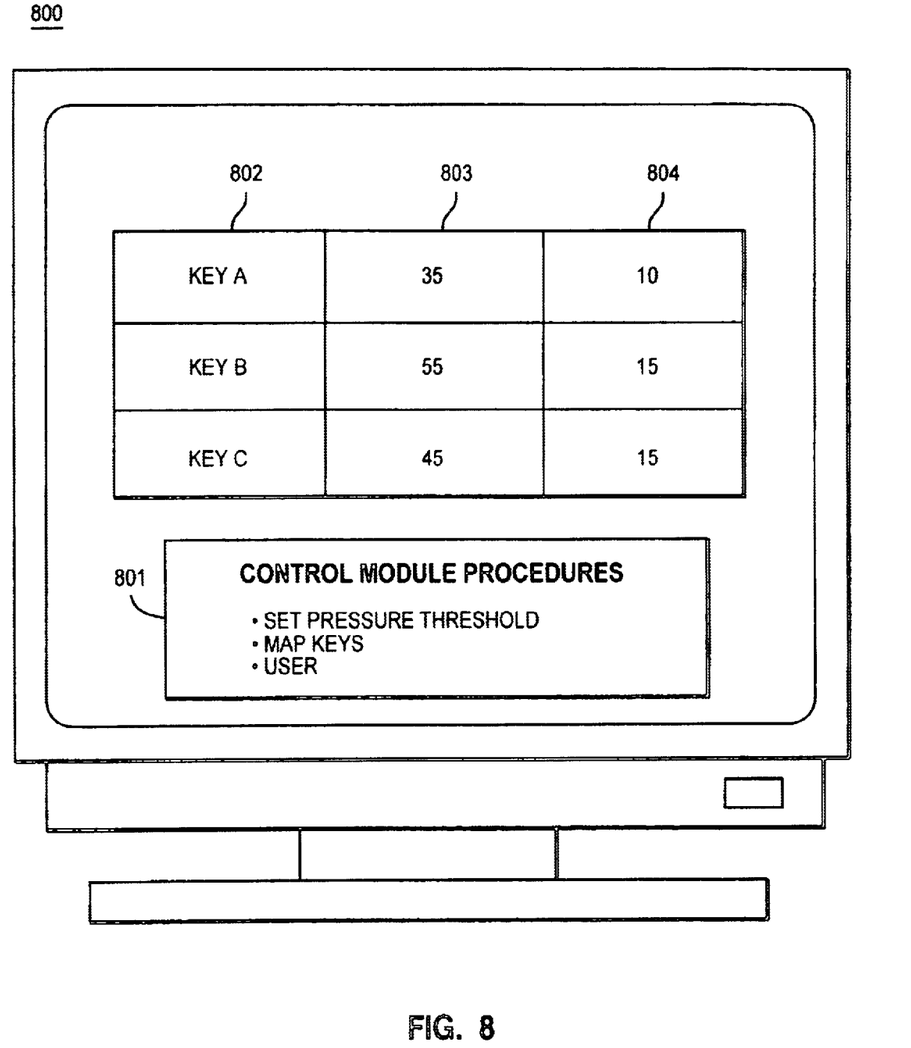

Referring now to FIG. 8, an exemplary GUI for presenting various aspects of the present invention on a display 210 is illustrated. The GUI 800 can include geographic areas of a user interface containing control module procedures 801, including those procedures specifically followed in relation to setting a pressure threshold, mapping key classes, and associating key depression pressure measurements with a user. Additional areas can include a list of keys 802, a pressure threshold for each key 803, a delta from a measured pressure 804 or other functional area.

A number of embodiments of the present invention have been described. Nevertheless, it will be understood that various modifications may be made without departing from the spirit and scope of the invention. For example, different types of pressure transducers can be utilized, control module software can be included in an operating system with other system features controls, a pattern of pressure across multiple keys can be associated with activation of a single keystroke, or other variations of the pressure sensitive keystroke registration. Accordingly, other embodiments are within the scope of the following claims.

What is claimed is:

1. An apparatus having a keyboard connected to a processing system for registering a keystroke to the processing system in response to an amount of pressure being exerted upon a key, the apparatus comprising;

a key, capable of a keystroke;

a pressure transducer to measure an amount of pressure applied during the keystroke;

a means to identify a user applying the pressure during the keystroke;

a means to determine a threshold amount of pressure needed to register a given keystroke for each of a plurality of users; and means for comparing the threshold amount of pressure needed to register the keystroke for the identified user to the measured amount of pressure applied during the keystroke.

2. The apparatus of claim 1 additionally comprising a control module for setting a threshold amount of pressure needed to register a keystroke.

3. The apparatus of claim 2 wherein the control module comprises an alphanumeric scale.

4. The apparatus of claim 1 wherein the threshold amount of pressure is set for each individual key.

5. The apparatus of claim 1 additionally comprising:

a means to measure an amount of pressure applied to each key during a profile building period; and a means to subtract a delta from the measured pressure applied to each key to determine the threshold amount of pressure for each individual key.

6. The apparatus of claim 1 wherein the pressure transducer comprises a pressure sensitive field effect transistor.

7. The apparatus of claim 1 wherein the pressure transducer is mounted beneath the key and is subjected to pressure as the key is depressed.

8. The apparatus of claim 1 additionally comprising a membrane for positioning the pressure transducer such that the transducer is subjected to pressure as the key is depressed.

9. A method for registering a keystroke on a keyboard, the method comprising:

first depressing a profile key during a profile building period;

first measuring the pressure resulting from the depression of the profile key;

designating a threshold pressure for a key sensitivity resulting from the measured pressure of depression of the profile key minus a predetermined delta;

second depressing a desired key on a keyboard;

second measuring the pressure of the desired key depression; and registering a keystroke of the desired key if the pressure of the desired key depression meets the threshold pressure for the key sensitivity.

10. The method of claim 9 wherein designating a threshold pressure for a key sensitivity comprises the steps of:

depressing a primary profile key and one or more additional profile keys simultaneously;

measuring a pattern of pressure resulting from the depression of the keys; and setting the threshold pressure for the primary key at the pattern of pressure resulting from the depression of the keys minus a predetermined delta for each key.

11. The method of claim 9 wherein the threshold pressure for a key sensitivity is designated via a graphical user interface.

12. The method of claim 9 wherein the threshold pressure for a key sensitivity is designated via a control panel incorporated into the keyboard.

13. The method of claim 9 additionally comprising the steps of:

mapping the keyboard with one or more key classes; and setting a pressure threshold for each key class.

14. Computer executable program code residing on a computer-readable medium, the program code comprising instructions for causing the computer to:

designate a threshold pressure for a key sensitivity for each of a plurality of users;

indicate a key on a keyboard being depressed;

identify a user depressing the key;

measure a pressure of the key depression; and register a keystroke if the pressure of the key depression meets the threshold pressure for the key sensitivity for the identified user.

15. The program code of claim 14 additionally comprising instructions for causing the computer to:

display an interactive control module capable of receiving input designating the threshold pressure for a key sensitivity.

16. The program code of claim 14 additionally comprising instructions for causing the computer to:

store data representing pressure measurements from registered and unregistered keystrokes; and reference the stored data to determine a subsequent threshold pressure.

17. The program code of claim 14 additionally comprising instructions for causing the computer to change a threshold pressure in response to a change in typing rate.

* * * * *